United States Patent
Kawakami et al.

[19]

[11] Patent Number: 5,263,901
[45] Date of Patent: Nov. 23, 1993

[54] SKID STEERING LOADER

[75] Inventors: Shuji Kawakami, Kashiwa; Takayuki Ban, Ryugasaki; Soichi Hareyama, Abiko; Yoshitsugu Ohno, Ibaragi; Hisashi Hara, Ushiku, all of Japan

[73] Assignee: Toyo Umpanki Co., Ltd., Osaka, Japan

[21] Appl. No.: 761,791

[22] PCT Filed: Jan. 25, 1991

[86] PCT No.: PCT/JP91/00084
§ 371 Date: Sep. 12, 1991
§ 102(e) Date: Sep. 12, 1991

[51] Int. Cl.$^5$ ............................................. B62D 11/04
[52] U.S. Cl. .................................. 180/6.48; 180/6.3; 364/424.05
[58] Field of Search ............... 180/6.48, 6.3, 140, 180/6.44, 6.28; 364/424, 424.01, 424.03, 424.05

[56] References Cited
U.S. PATENT DOCUMENTS 4,631,920 12/1986 Seelman .................... 180/6.48 X
4,823,895 4/1989 Kimball ...................... 180/6.48
4,914,592 4/1990 Callahan et al. ............ 180/6.48 X
4,962,821 10/1990 Kim ............................ 180/6.48
5,137,100 8/1992 Scott et al. ................. 180/6.48

Primary Examiner—Joseph D. Pape
Attorney, Agent, or Firm—Barnes, Kisselle, Raisch, Choate, Whittemore & Hulbert

[57] ABSTRACT

A skid steering loader capable of performing on-the-spot rotation. The loader has a wheel-type handle, an accelerator pedal, and a drive lever for setting the loader to forward, neutral, and rearward positions. A control device receives a handle turn angle signal, an accelerator pedalling angle signal, and a drive instruction signal from the drive lever. The control device controls a drive mechanism for driving left and right wheels in response to these signals to thereby separately control the numbers of turns of and directions of rotation of the wheels. The skid steering loader can be operated by manipulating the accelerator, handle, and drive lever in same manner as an ordinary automotive vehicle.

5 Claims, 10 Drawing Sheets

SKID STEERING LOADER

TECHNICAL FIELD

The present invention relates to an on-the-spot rotatable handling vehicle, or a skid steering loader. The term "on-the-spot rotatable", wherever used herein, means that the vehicle is rotatable in situ substantially without forward or backward movement.

BACKGROUND ART

A skid steerable loader has a vehicle body carried by wheels, left and right, such that the wheels are adapted to be differentiated from each other in number of revolutions and/or direction of rotation whereby the loader, as a vehicle, can be steered without steering the wheels. When the left and right wheels are rotated in opposite directions and at same speed, the vehicle performs such on-the-spot rotation as above defined. One typical example of such skid steering loader is described in Japanese Patent Application Laid-Open Publication No. 2-61228.

The skid steering loader disclosed in the JP Application Laid-Open Publication No. 2-61228 basically includes a vehicle body, wheels rotatably mounted to the vehicle body at the left and right sides thereof, and a pair of hydraulic drive units for separately driving the left and right wheels to rotate. The hydraulic drive units are controlled by manipulating one or two multidirectional lever switch devices mounted on the vehicle body for driving and/or steering the loader.

Such manner of controlling the drive mechanism as in the known skid steering loader, wherein the loader is controlled by one or two multidirectional lever switches for being driven to run and/or steered as above mentioned, is very uncommon. Therefore, operation of the loader requires experience, which fact presents a problem that the loader is unfit for being operated by a beginner driver.

SUMMARY OF THE INVENTION

It is a primary object of the invention to provide a skid steering loader which can easily be operated by a driver having experience in driving ordinary automotive cars.

In order to accomplish this object, the skid steering loader in accordance with the present invention comprises:

left and right wheels, means for driving the left and right wheels in independent numbers of revolutions and in independent directions, a wheel-type steering handle, an accelerator pedal, a drive lever operative to generate instruction signals for "forward", "neutral", and "rearward" with respect to said loader according to respective positions to which the lever is manipulated, first sensor means for detecting an angle of turn of said handle, second sensor means for detecting an angle of pedaling said accelerator pedal, and means for inputting a drive instruction signal from said drive lever, a signal indicative of the angle of handle turn from said first sensor means, and a signal indicative of the angle of accelerator pedaling from said second sensor means and for controlling the wheels driven by said driving means in their respective numbers of revolutions and directions of rotation according to the signals.

According to such arrangement, the wheels are suitably controlled by the control means as to their respective number of revolutions and directions of rotation, according to the angle of handle turn, angle of accelerator pedaling, and the positions to which the driving lever is manipulated. Therefore, the loader is operable in same manner as any ordinary automotive vehicle and accordingly it may easily be operated by a person having ordinary automobile driving experience.

According to one preferred embodiment of the invention, it is possible to select one or more modes of operation in which a particular condition for carrying out on-the-spot rotation is preset. There are the following modes of operation:

(A) operation mode in which on-the-spot rotation is carried out only when the steering handle is turned full during forward or rearward movement of the loader, in which mode the center of rotation may be changed successively;

(B) operation mode in which on-the-spot rotation is carried out only when the driving lever is at the neutral position, in which mode the rotation may be carried out intermittently through control of the driving lever; and (C) operation mode in which on-the-spot rotation is carried out only when a push-button switch on a knob portion of the steering handle is manipulated, in which mode the rotation may be carried out intermittently through manipulation of the push-button switch.

BEST MODE FOR CARRYING OUT THE INVENTION

Figure 1:
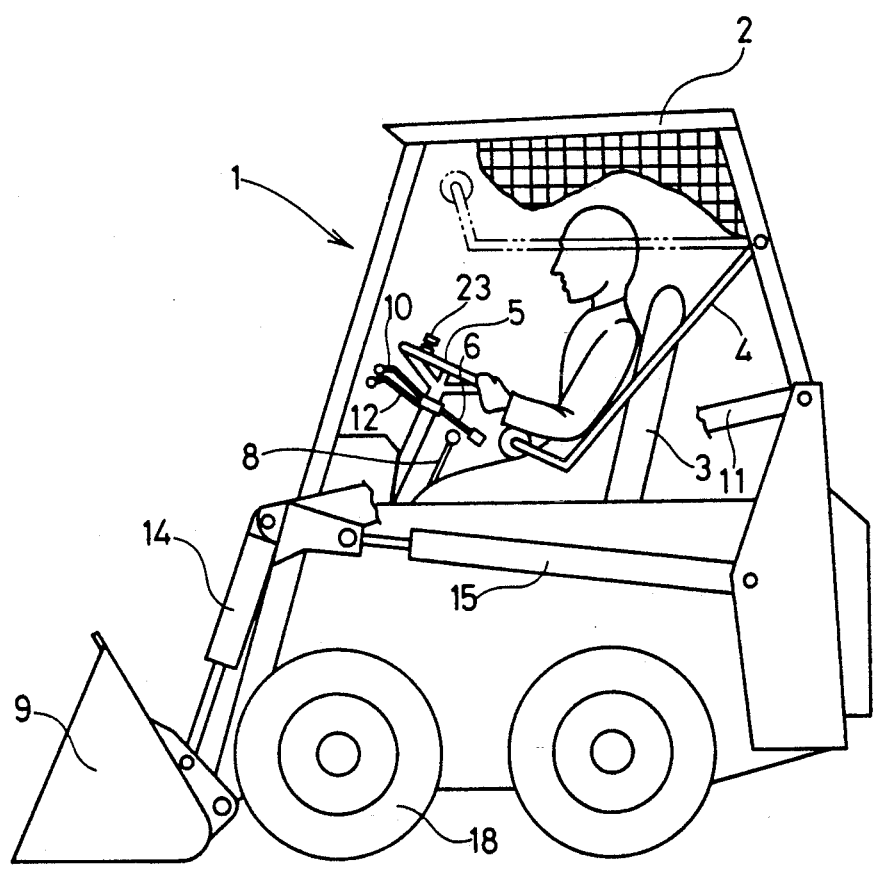
FIG. 1 is an exterior side view showing one embodiment of the skid steering loader according to the invention.

In FIG. 1, there is shown a skid steering loader in which an operator sitting on a driver's seat protected by a head guard, with a sheet bar 4 fitted in position for protection in case of collision. The skid steering loader 1 includes a rotatable steering handle 5 for controlling the direction of movement of the loader 1, a driving lever 6 for giving to the loader 1 a drive instruction, such as "forward" (F), "neutral" (N), or "rearward" (R), an engine 7 as shown in FIG. 2, a slot lever 8 for controlling the speed of the engine 7, a bucket lever 10 operative to move a bucket 9 upward and downward, a boom lever 12 operative to move a boom 11 upward and downward, an accelerator pedal 13 as shown in FIG. 2, and a brake pedal not shown.

In this skid steering loader 1, the run of the engine 7 is first kept at a predetermined speed and, in turn, the accelerator pedal 13 is controlled, whereby the loader 1 is driven to run. To cause the loader 1 to perform handling operation, the bucket 9 and boom 11 are operated by a bucket cylinder 14 and a boom cylinder 15 respectively.

Figure 2:
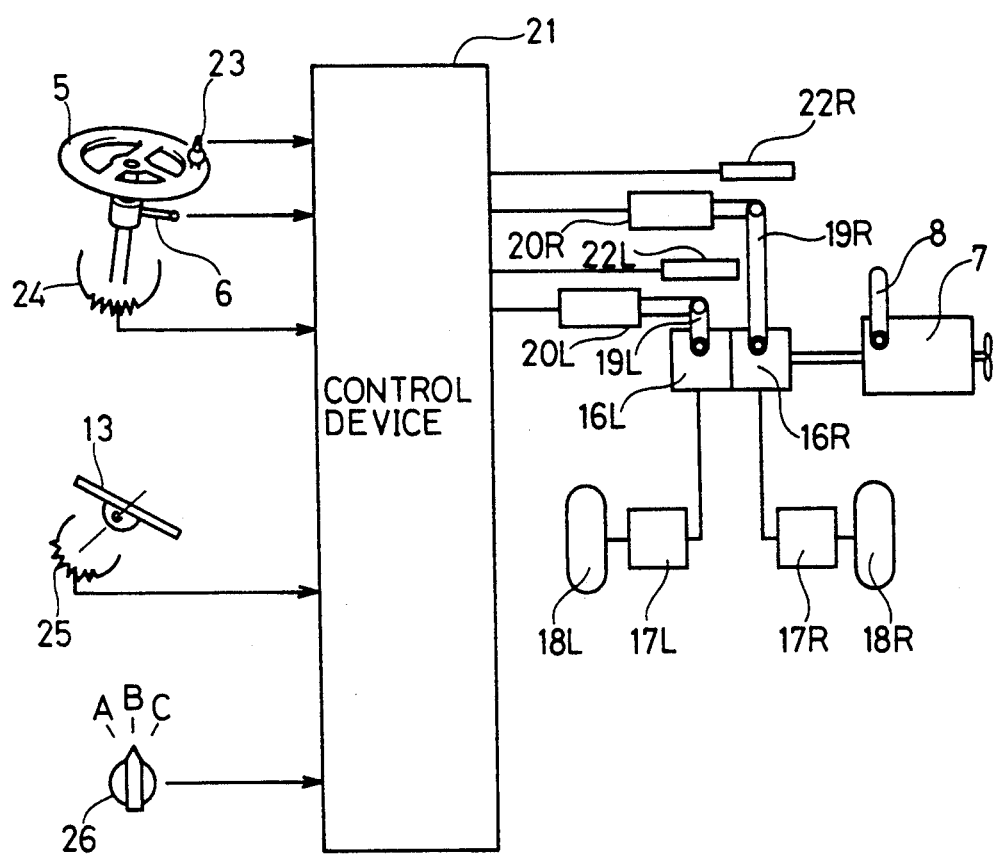
FIG. 2 is a view showing the arrangement of portions of the drive control system of the skid steering loader in FIG. 1.

Referring next to FIG. 2, there is illustrated a drive system for movement of the loader 1.

As shown, the engine 7 is so controlled that its speed will reach a specified speed corresponding to a manipulated variable of the slot lever 8. The revolving effort of the engine 7 is transmitted to left and right H S T (hydrostatic) pumps 16L, 16R, which in turn pressurize a hydraulic oil to high pressure condition. The high-pressure hydraulic oil is fed to left and right hydraulic drive motors 17L, 17R, from which are supplied driving torques by which left and right wheels 18L, 18R are driven independently of each other.

The directions in which hydraulic oil is fed, and the quantities of hydraulic fluid which are supplied to the H S T pumps 16L, 16R are determined according to respective positions to which steering levers 19L, 19R are manipulated, with a neutral position defined as a border. Thus, directions of rotation of, and the numbers of revolutions of the wheels 18L, 18R vary according to the positions to which the steering levers 19L, 19R are manipulated, whereby the steering of the loader 1 is carried out. When the wheels 18L, 18R are rotated in the same direction and at same speed, the loader 1 will move straightforward. When the wheels 18L, 18R are rotated in opposite directions and at same speed, on-the-spot rotation of the loader is carried out.

Respective positions of the steering levers 19L, 19R are controlled by a control device 21 through motor-driven cylinders 20L, 20R which drive the steering levers 19L, 19R. The positions of the steering levers 19L, 19R are fed back to the control device 21 by potentiometers 22L, 22R respectively.

The control device 21 receives a switch signal from a pushbutton switch 23 in a knob portion provided on the handle 5, a drive instruction signal generated through manipulation of the driving lever 6, a signal from a potentiometer 24 detecting an angle of turn of the handle 5 which is indicative of the angle of turn, a signal from a potentiometer 25 detecting an angle of pedaling the accelerator pedal 13 which is indicative of the pedaling angle, and a mode signal from a change mode switch 26. The mode switch 26 is operated for selection of operation mode A, B or C which will be described hereinafter.

Figure 3:
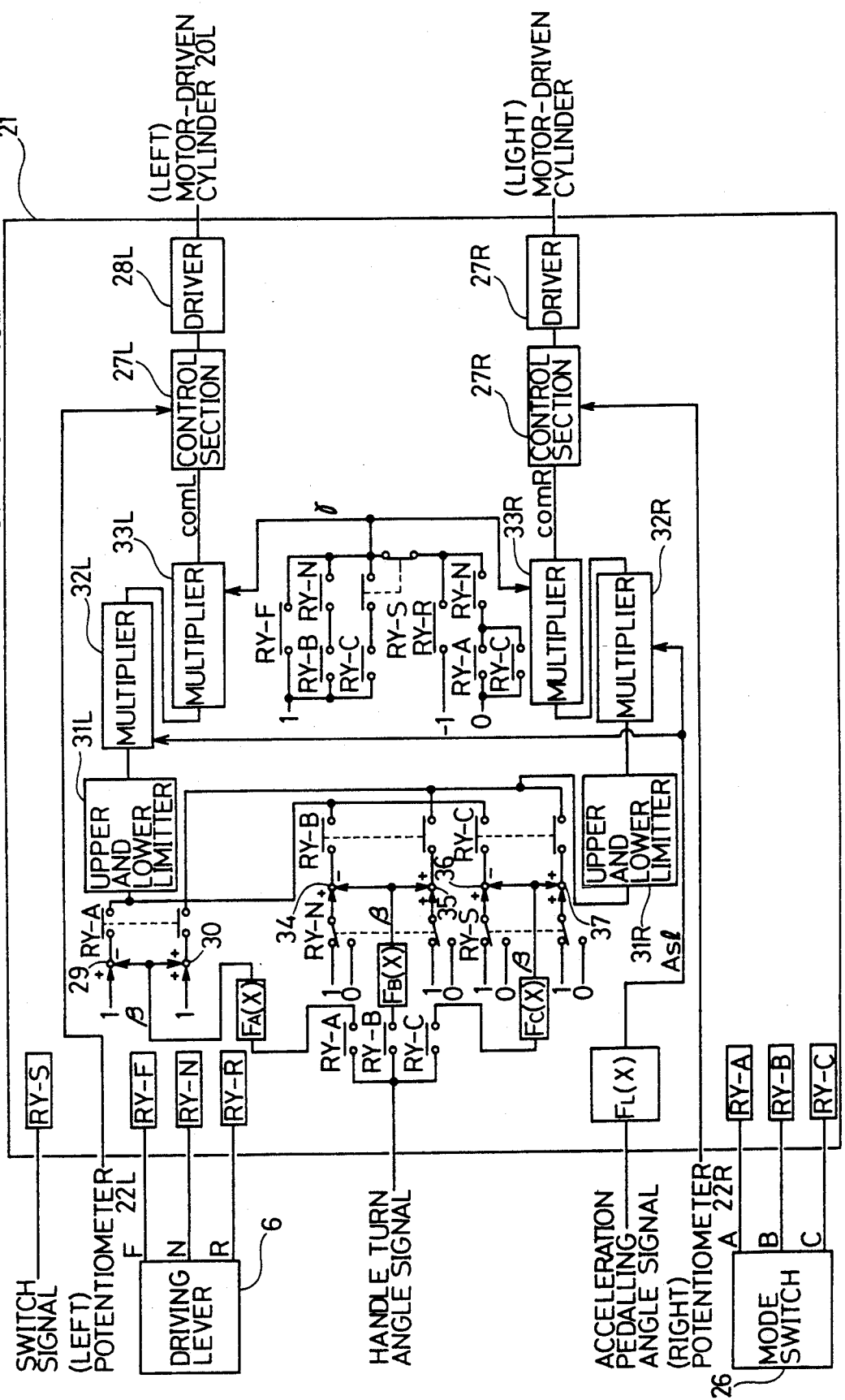
FIG. 3 is a block diagram showing a control device in the drive control system in FIG. 2.

The control device 21 will be described in detail with reference to the block diagram shown in FIG. 3.

The control device 21 includes a relay RY-S which is actuated when the switch signal from the pushbutton switch 23 is "on", a relay RY-F which is actuated when the drive instruction signal from the driving lever 6 is "forward (F)", a relay RY-N which is actuated when the drive instruction signal is "neutral (N)", a relay RY-R which is actuated when the drive instruction signal is "rearward (R)", a relay RY-A which is actuated when the mode signal from the mode switch 26 is "operation mode A", a relay RY-B which is actuated when the mode signal is "operation mode B", and a relay RY-C which is actuated when the mode signal is "operation mode C". The angle of handle turn signal from the potentiometer 24 is transduced by these relays into drive command signals comL, comR which are control signals for controlling the driving and/or steering of the loader 1.

These drive command signals comL, comR are inputted to control sections 27L, 27R to which are also inputted steering lever position signals from the potentiometers 22L, 22R as feedback signals. The control sections 27L, 27R control respective positions of the motor-driven cylinders 20L, 20R through drivers 28A, 28B so that positions of the steering levers 19L, 19R will be target lever positions corresponding to drive command signals comL, comR.

Nextly, the manner of defining such target drive lever positions (drive command signals comL, comR) will be explained for each of the operation modes A, B and C.

It is noted here that operation mode A is a mode of operation in which on-the-spot rotation is carried out only when the handle 5 is turned full during forward or backward movement of the loader 1.

Operation mode B is a mode of operation in which on-the-spot rotation is carried out only when the driving lever 6 is at neutral position.

Operation mode C is a mode of operation in which on-the-spot rotation is carried out only when the pushbutton switch 23 on the knob portion of the handle 5 is manipulated.

Operation mode A

Figure 4:
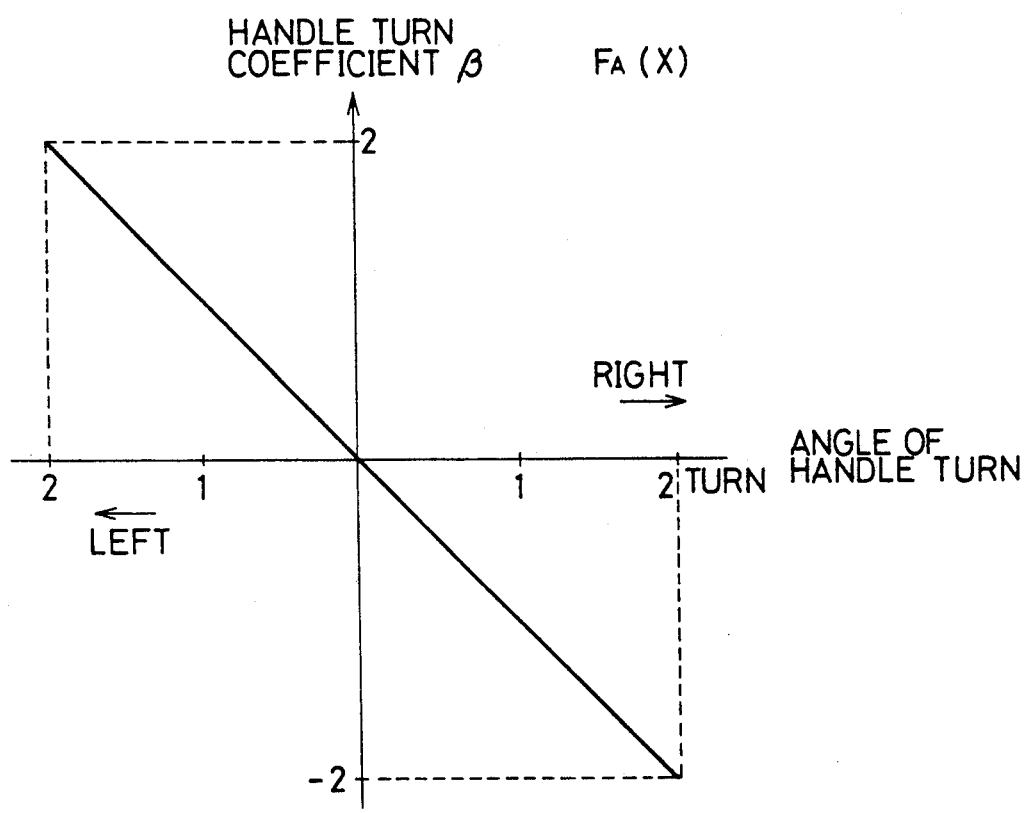
FIGS. 4 to 7 are views showing respective characteristics of function generators within the control device.

When operation mode A is selected by mode switch 26, a handle turn angle signal is inputted to a function generator $F_A(X)$. As FIG. 4 shows, the angle of handle turn is transduced into a handle turn coefficient $\beta$, with two turns, right or left, being taken as 100%. The handle turn coefficient $\beta$ assumes a value within the range of $(-2$ to $2)$.

Figure 7:
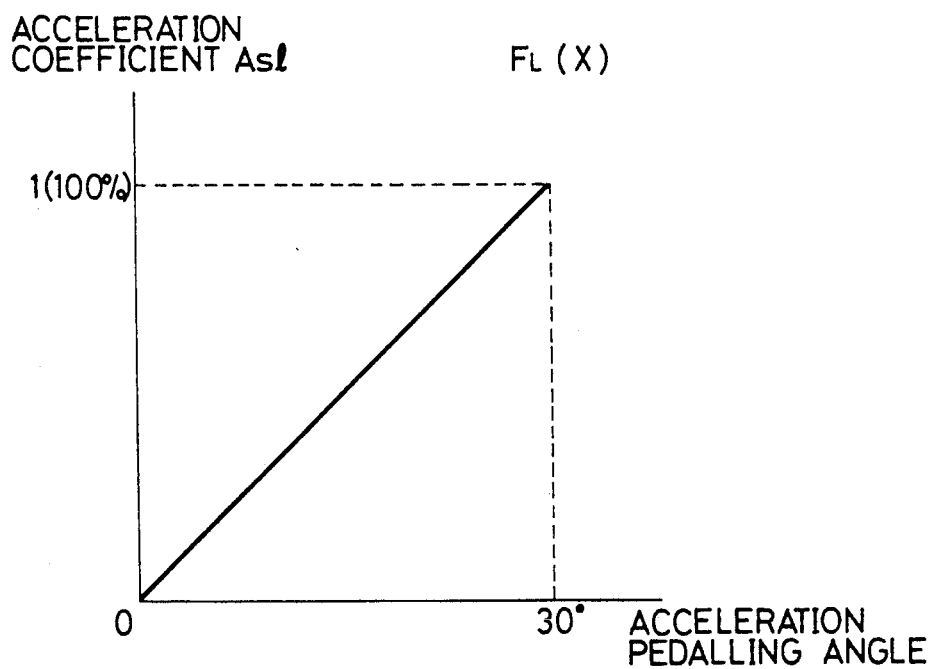

The handle turn coefficient $\beta$ is inputted to adders 29, 30 for generation of left and right drive command signals comL, comR, and at the left side it is transduced by the adder 29 into $(1-\beta)$, while at the right side it is transduced by the adder 30 into $(1+\beta)$. The respective values are limited by upper and lower limiters 31L, 31R to values within the range of $(-1$ to $1)$. A function generator $F_L(X)$ receives an acceleration pedalling angle signal and generates an acceleration coefficient Asl on the basis of the input as shown in FIG. 7. Signals which have passed through the limiters 31L, 31R are subjected to multiplication in multipliers 32L, 32R and are then inputted to multipliers 33L, 33R.

Transduction is carried out at the multipliers 33L, 33R according to the direction of movement of the loader 1. More particularly, an F/R coefficient $\gamma$ based on a drive instruction from the driving lever 6 ($\gamma = 1$ when the instruction is "forward (F)"; $\gamma = 0$ when "neutral (N)"; and $\gamma = -1$ when "rearward (R)") is first created in a circuit in which the earlier mentioned relays are arranged. Then, in the multipliers 33L, 33R, multiplication is carried out using the F/R coefficient $\gamma$ as a constant to generate relevant drive command instructions comL, comR.

Figure 8:
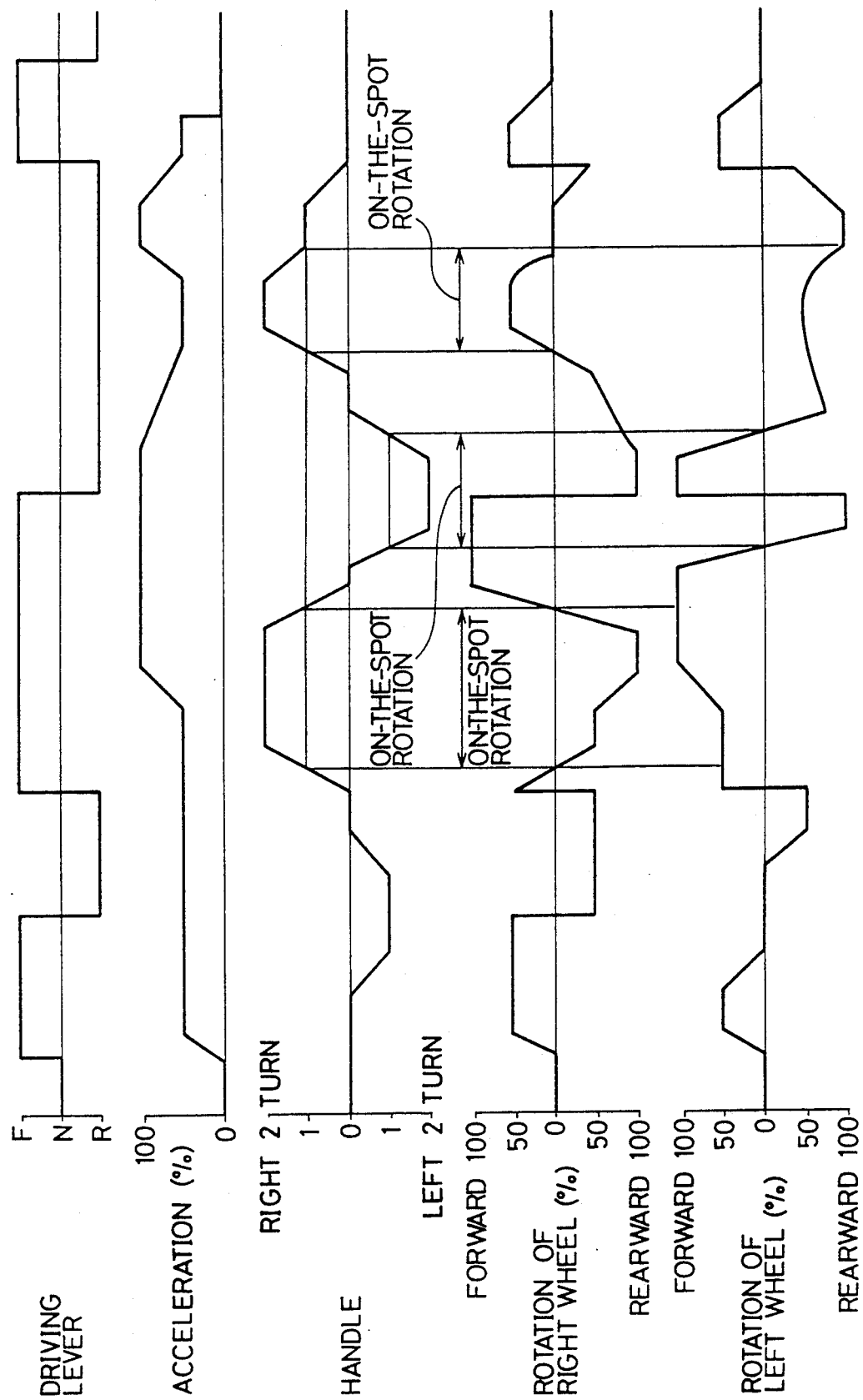
FIGS. 8 to 10 are wave-form diagrams showing aspects of control for different modes of operation.

Values of comL, comR in operation mode A, where acceleration coefficient Asl=1, are shown in Table 1. As can be clearly seen from Table 1, when the handle 5 is rotated, for example, 2 turns to the right or 2 turns to the left, both comL and comR are valued at 100% (=1) on opposite sides. In other words, the left and right wheels 18L, 18R are rotated at same speed but in opposite directions, so that on-the-spot rotation is carried out. When the handle 5 is rotated one turn to the right, the left wheel 18L is rotated a full turn and, on the other hand, the right wheel 18R is not rotated; in this case right-side pivoted rotation is carried out. Similarly, when the handle 5 is rotated one turn to the left, left-side pivoted rotation is carried out. Operating conditions in case of operation mode A are shown by way of example in FIG. 8.

TABLE 1

|  | F (γ = 1) | | N (γ = 0) | R (γ = −1) | Asl = 1 |
|---|---|---|---|---|---|
|  | comL | comR | comL, comR | comL | comR |
| 2 turns, right (β = −2) | 1 | −1 | 0 | −1 | 1 |
| 1 turn, right (β = −1) | 1 | 0 | 0 | −1 | 0 |
| Center (β = 0) | 1 | 1 | 0 | −1 | −1 |
| 1 turn, left (β = 1) | 0 | 1 | 0 | 0 | −1 |
| 2 turns, left (β = 2) | −1 | 1 | 0 | 1 | −1 |

Operation mode B

Figure 5:
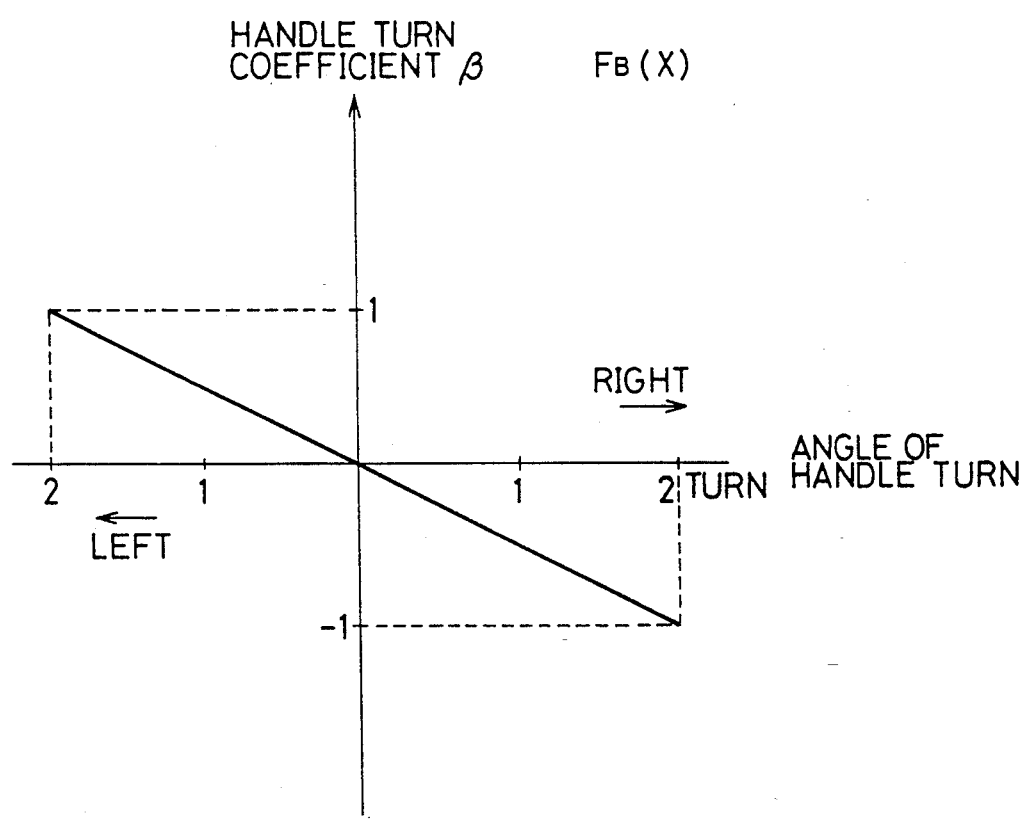

When operation mode is selected by mode switch 26, a handle turn angle signal is inputted to a function generator $F_B(X)$ and, as FIG. 5 shows, the angle of handle turn is translated into a handle turn coefficient β (−1 to 1), with two turns, right or left, being taken as 100%. When the drive instruction signal is not neutral (N), the coefficient is translated into $(1-\beta)$ at an adder 34 and into $(1+\beta)$ at an adder 35. When the drive instruction signal is neutral (N), the coefficient is translated into $(-\beta)$ at the adder 34 and is allowed to remain as it is (β) at the adder 35. Coefficient values are limited to a value range of (−1 to 1) at the upper and lower limitters 31L, 31R and are then subjected to multiplication at the multipliers 32L, 32R using acceleration coefficient Asl as a constant. Again, multiplication is carried out at the multipliers 33L, 33R using F/R coefficient γ. Thus, drive command signals comL, comR are generated.

Figure 9:
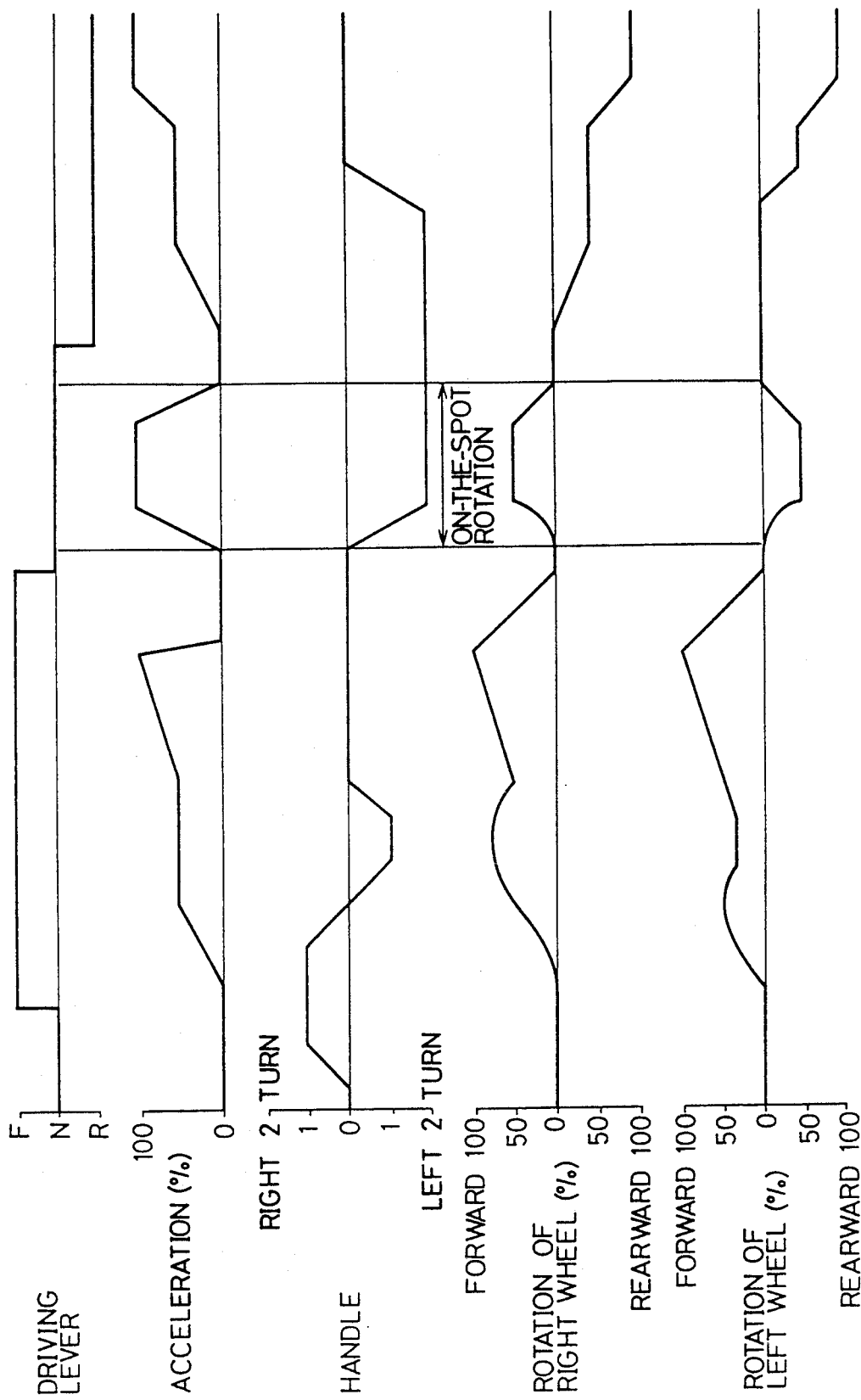

Values of comL, comR in this operation mode B, where acceleration coefficient Asl=1, are shown in Table 2. As may be appreciated from Table 2, when the handle 5 is rotated, with drive levers 6 held neutral, values of comL, comR are identical on opposite sides, and thus on-the-spot rotation is carried out. When the handle 5 is rotated 2 turns to the right during forward or rearward movement of the loader, right-side pivoted rotation is carried out. Similarly, when the handle 5 is rotated 2 turns to the left, left-side pivoted rotation is carried out. Operating conditions in case of operation mode B are shown by way of example in FIG. 9.

TABLE 2

|  | F (γ = 1) | | N (γ = 0) | | R (γ = −1) | Asl = 1 |
|---|---|---|---|---|---|---|
|  | comL | comR | comL | comR | comL | comR |
| 2 turns, right (β = −1) | 1 | 0 | 1 | −1 | −1 | 0 |
| 1 turn, right (β = −0.5) | 1 | 0.5 | 0.5 | −0.5 | −1 | −0.5 |
| Center (β = 0) | 1 | 1 | 0 | 0 | −1 | −1 |
| 1 turn, left (β = 0.5) | 0.5 | 1 | −0.5 | 0.5 | −0.5 | −1 |
| 2 turns, left (β = 1) | 0 | 1 | −1 | 1 | 0 | −1 |

Operation mode C

Figure 6:
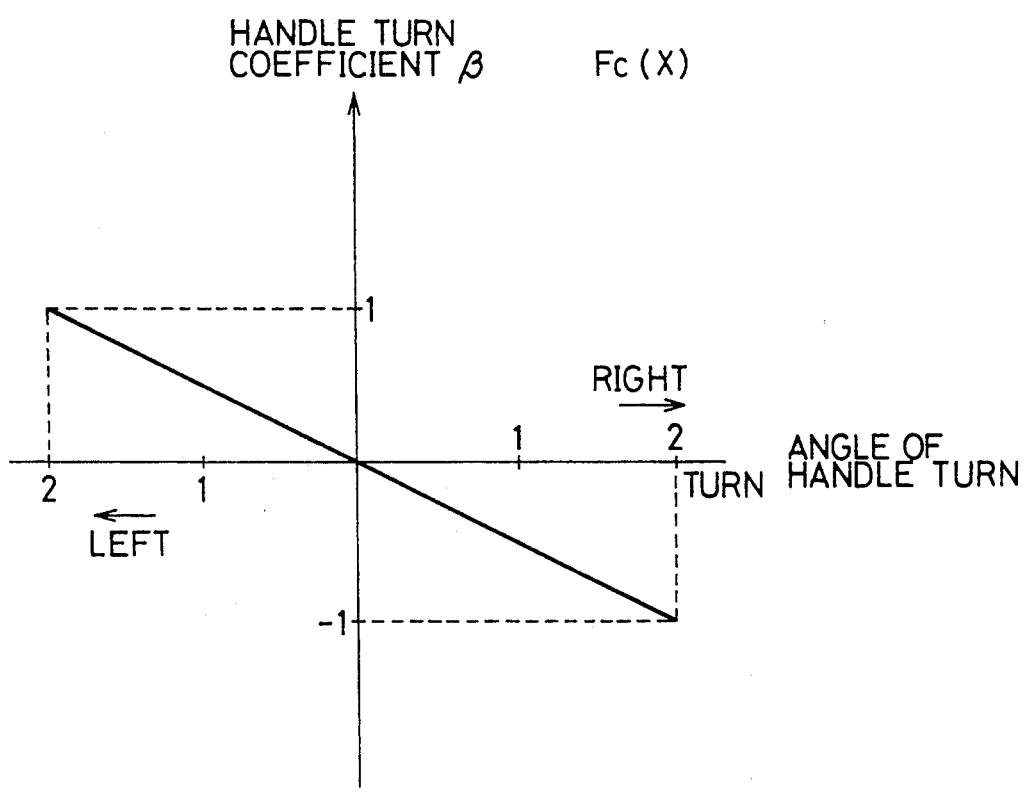

When operation mode C is selected by mode switch 26, a handle turn angle signal is inputted to a function generator $F_C(X)$ and, as FIG. 6 shows, the angle of handle turn is translated into a handle turn coefficient β (−1 to 1), with two turns, right or left, being taken as 100%. When the switch signal from the pushbutton switch 23 on the knob portion of the handle 5 is not "on", the coefficient is translated into $(1-\beta)$ at an adder 36 and into $(1+\beta)$ at an adder 37. When the switch signal is "on", the coefficient is translated into $(-\beta)$ at the adder 36 and is allowed to remain as it is (β) at the adder 37. As in foregoing operation modes A and B, drive command signals comL, comR are formed via upper and lower limitters 31L, 31R, multipliers 32L, 32R, and multipliers 33L, 33R.

When the switch signal from the pushbutton switch 23 is "on", F/R coefficient γ=1. When the switch signal from the pushbutton switch 23 is "off", γ=1 in case of "forward (F)", γ=0 in case of "newtral (N)", and γ=−1 in case of "rearward (R)".

Figure 10:
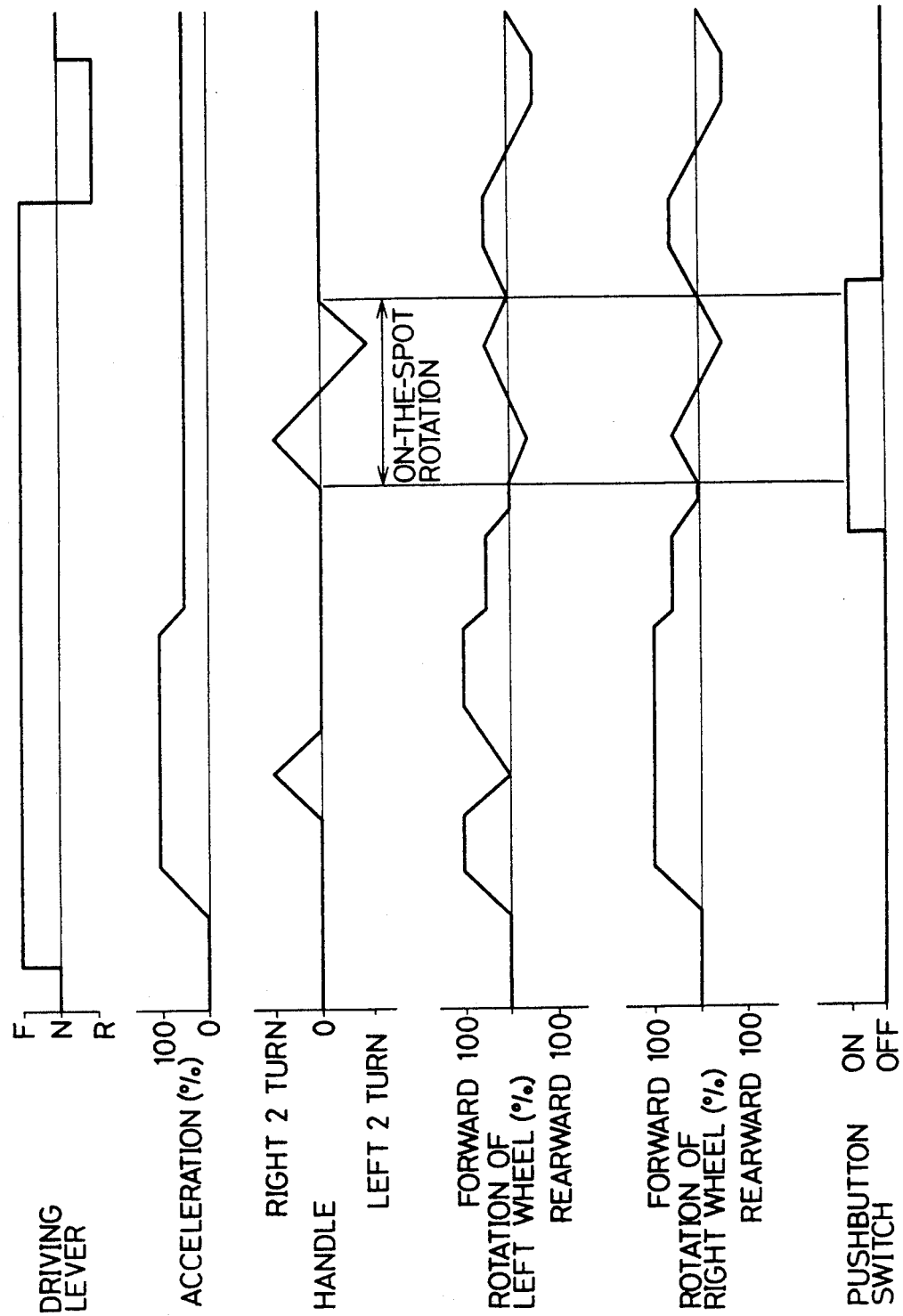

Values of comL, comR in this operation mode C, where acceleration coefficient Asl=1, are shown in Table 3. As may be understood from Table 3, when the pushbotton switch 23 on the knob portion is "on", values of comL, comR are identical on opposite sides, and thus on-the-spot rotation is carried out. When the handle 5 is rotated 2 turns to the right during forward or rearward movement of the loader, right-side pivoted rotation is carried out. Similarly, when the handle 5 is rotated 2 turns to the left, left-side pivoted rotation is carried out. Operating conditions in case of operation mode C are shown by way of example in FIG. 10.

TABLE 3

|  | switch signal OFF | | | | | | Asl = 1 switch signal ON (γ = 1) | |
|---|---|---|---|---|---|---|---|---|
|  | F (γ = 1) | | N (γ = 0) | R (γ = −1) | | | | |
|  | comL | comR | comL, comR | comL | comR | | comL | comR |
| 2 turns, right (β = −1) | 1 | 0 | 0 | −1 | 0 | | 1 | −1 |
| 1 turn, right (β = −0.5) | 1 | 0.5 | 0 | −1 | −0.5 | | 0.5 | −0.5 |
| Center (β = 0) | 1 | 1 | 0 | −1 | −1 | | 0 | 0 |
| 1 turn, left (β = 0.5) | 0.5 | 1 | 0 | −0.5 | −1 | | −0.5 | 0.5 |
| 2 turns, left (β = 1) | 0 | 1 | 0 | 0 | −1 | | −1 | 1 |

In this way, drive command signals comL, comR are formed through manipulation of handle 5, driving lever 6, acceleration pedal 13, and the like, and drive control is performed in response to the drive command signals comL, comR. Therefore, the skid steering loader of the invention can be operated in substantially same way as an ordinary automotive vehicle. Furthermore, on-the-spot rotation, a characteric aspect of the skid steering loader 1, can be achieved through control of the handle 5.

In the foregoing embodiment, motor-driven cylinders 20L, 20R are controlled by using, as feedback signals, signals from the potentiometers 22L, 22R which are indicative of actual positions of steering levers 19L, 19R. Alternatively, similar control may be performed by using signals such as numbers of turns of the wheels 18L, 18R as feedback signals.

In the foregoing embodiment, HST pumps 16L, 16R controlled by steering levers 19L, 19R are employed and it is arranged that positions of the steering levers 19L, 19R are fed back to the control device 21 by potentiometers 22L, 22R. As an alternative, HST pumps of the EDC (electrical displacement control) type may be employed.

Where such EDC type HST pumps are employed, it is possible to control the amount of oil supply directly by electrical signaling, so that the steering levers can be dispensed with. Therefore, it is unnecessary to provide actuators for controlling the steering levers. Hence, such feedback control as above mentioned is not required.

What is claimed is:

1. A skid steering loader wherein left and right wheels are adapted to be differentiated from each other in number of revolutions and/or direction of rotation whereby the loader can be steered without steering the wheels, comprising:
   left and right wheels,
   means for driving the left and right wheels in independent numbers of revolutions and in independent directions,
   a wheel-type steering handle,
   an accelerator pedal,
   a drive lever operative to generate instruction signals for "forward", "neutral", and "rearward" with respect to said loader according to respective positions to which the lever is manipulated,
   first sensor means for detecting an angle of turn of said handle,
   second sensor means for detecting an angle of pedaling said accelerator pedal,
   means for inputting a drive instruction signal from said drive lever, a signal indicative of the angle of handle turn from said first sensor means, and a signal indicative of the angle of accelerator pedaling from said second sensor means and for controlling the wheels driven by said driving means in their respective number of revolutions and directions of rotation according to the signals, and
   means for multiplying together a first signal transduced from the signal indicative of the angle of handle turn, a second signal transduced from the signal indicative of the angle of accelerator pedaling, and a third signal transduced from the signal indicative of the dive instruction signal.

2. A skid steering loader as set forth in claim 1, further comprising means for transducing the handle turn angle signal and drive command signal into different sets of control signals which are different with respect to the left and right wheels, in order to separately control the left and right wheels.

3. A skid steering loader wherein left and right wheels are adapted to be differentiated from each other in number of revolutions and/or direction of rotation whereby the loader can be steered without steering the wheels, comprising:
   left and right wheels,
   means for driving the left and right wheels in independent numbers of revolutions and in independent directions,
   a wheel-type steering handle,
   an accelerator pedal,
   a drive lever operative to generate instruction signals for "forward", "neutral", and "rearward" with respect to said loader according to respective positions to which the lever is manipulated,
   first sensor means for detecting an angle of turn of said handle,
   second sensor means for detecting an angle of pedaling said accelerator pedal,
   means for inputting a drive instruction signal from said drive lever, a signal indicative of the angle of handle turn from said first sensor means, and a signal indicative of the angle of accelerator pedaling from said second sensor means and for controlling the wheels driven by said driving means in their respective number of revolutions and directions of rotation according to the signals,
   said skid steering loader being capable of carrying out on-the-spot rotation when the left and right wheels are rotated in opposite directions and at same speed, and
   means for selecting a mode of operation in which on-the-spot rotation is carried out only when the handle is rotated a full turn during forward or rearward movement of the loader.

4. A skid steering loader wherein left and right wheels are adapted to be differentiated from each other in number of revolutions and/or direction of rotation whereby the loader can be steered without steering the wheels, comprising:
   left and right wheels,
   means for driving the left and right wheels in independent numbers of revolutions and in independent directions,
   a wheel-type steering handle,
   an accelerator pedal,
   a drive lever operative to generate instruction signals for "forward", "neutral", and "rearward" with respect to said loader according to respective positions to which the lever is manipulated,
   first sensor means for detecting an angle of turn of said handle,
   second sensor means for detecting an angle of pedaling said accelerator pedal,
   means for inputting a drive instruction signal from said drive lever, a signal indicative of the angle of handle turn from said first sensor means, and a signal indicative of the angle of accelerator pedaling from said second sensor means and for controlling the wheels driven by said driving means in their respective number of revolutions and directions of rotation according to the signals,
   said skid steering loader being capable of carrying out on-the-spot rotation when the left and right wheels are rotated in opposite directions and at same speed, and means for selecting a mode of operation in which on-the-spot rotation is carried out only when the driving lever is in neutral position.

5. A skid steering loader wherein left and right wheels are adapted to be differentiated from each other in number of revolutions and/or direction of rotation whereby the loader can be steered without steering the wheels, comprising:

left and right wheels, means for driving the left and right wheels in independent numbers of revolutions and in independent directions, a wheel-type steering handle, an accelerator pedal, a drive lever operative to generate instruction signals for "forward", "neutral", and "rearward" with respect to said loader according to respective positions to which the lever is manipulated, first sensor means for detecting an angle of turn of said handle, second sensor means for detecting an angle of pedaling said accelerator pedal, means for inputting a drive instruction signal from said drive lever, a signal indicative of the angle of handle turn from said first sensor means, and a signal indicative of the angle of accelerator pedaling from said second sensor means and for controlling the wheels driven by said driving means in their respective number of revolutions and directions of rotation according to the signals, said skid steering loader being capable of carrying out on-the-spot rotation when the left and right wheels are rotated in opposite directions and at same speed, and a knob portion provided on the handle, a switch disposed on the knob portion, and means for selecting a mode of operation in which on-the-spot rotation is carried out only when the pushbotton switch is manipulated.

* * * * *